United States Patent
Ruan et al.

(10) Patent No.: US 9,747,928 B1
(45) Date of Patent: Aug. 29, 2017

(54) DATA STORAGE DEVICE MODIFYING WRITE OPERATION WHEN A LASER MODE HOP IS DETECTED

(71) Applicant: Western Digital Technologies, Inc., Irvine, CA (US)

(72) Inventors: Huanxiang Ruan, Irvine, CA (US); Galvin Chia, Rancho Santa Margarita, CA (US); Prakash Balasubramaniam, Rancho Santa Margarita, CA (US); Phillip S. Haralson, Huntington Beach, CA (US); Dennis W. Hogg, Laguna Hills, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 14/497,285

(22) Filed: Sep. 25, 2014

(51) Int. Cl.
 *G11B 5/00* (2006.01)
 *G11B 7/125* (2012.01)
 *G11B 5/09* (2006.01)
 *G11B 7/0045* (2006.01)

(52) U.S. Cl.
 CPC ............ G11B 5/09 (2013.01); G11B 7/00456 (2013.01); *G11B 2005/0021* (2013.01)

(58) Field of Classification Search
 CPC ............... G11B 7/1263; G11B 7/1267; G11B 20/10027; G11B 20/1879; G11B 7/0943; G11B 7/0945; G11B 7/126; G11B 2020/1281; G11B 7/00458; G11B 2020/10972; G11B 20/10009; G11B 20/10037; G11B 20/10046; G11B 20/10212; G11B 20/10231; G11B 20/10333; G11B 20/1426; G11B 20/1816; G11B 20/182; G11B 2220/2537; G11B 7/0045; G11B 7/00454; G11B 7/00456; G11B 7/00718; G11B 2005/0021; G11B 7/0062; G11B 5/02; G11B 5/455; G11B 5/607; G11B 11/10515; G11B 11/10595; G11B 13/04; G11B 2007/0006; G11B 20/82; G11B 2220/2516; G11B 27/36; G11B 5/3136; G11B 5/40; G11B 5/6005; G11B 5/6011; G11B 5/6058; G11B 5/6064; G11B 5/6088; G11B 7/003; G11B 7/005; G11B 7/00736; G11B 7/094; G11B 7/00; G11B 7/1275; G11B 7/1353; G11B 7/1356; G11B 7/1395; G11B 7/125; G11B 7/1392; G02B 26/127; G06F 11/1092; G06F 11/1662; G06F 11/2082; G06F 11/2094;
 (Continued)

(56) References Cited

U.S. PATENT DOCUMENTS

| | | | |
|---|---|---|---|
| 5,032,879 | A | 7/1991 | Buchmann et al. |
| 5,392,273 | A | 2/1995 | Masaki et al. |
| 5,805,559 | A | 9/1998 | Murakami et al. |

(Continued)

*Primary Examiner* — Dionne H Pendleton (57) ABSTRACT

A data storage device is disclosed comprising a first head actuated over a first disk surface, wherein the first head comprises a laser configured to heat the first disk surface while writing data to the first disk surface. A write power is applied to the laser when executing a first write operation, and the first write operation is paused when a transient increase in the output power of the laser is detected. In another embodiment, a write-verify of the written data is executed when a transient decrease in the output power of the laser is detected.

24 Claims, 8 Drawing Sheets

(58) Field of Classification Search
CPC ........ G06F 2211/1059; G06K 15/1204; G06K 15/1214
See application file for complete search history.

(56) References Cited

U.S. PATENT DOCUMENTS

| | | | |
|---|---|---|---|
| 6,018,789 A | 1/2000 | Sokolov et al. |
| 6,046,970 A | 4/2000 | DeCusatis et al. |
| 6,065,095 A | 5/2000 | Sokolov et al. |
| 6,078,452 A | 6/2000 | Kittilson et al. |
| 6,081,447 A | 6/2000 | Lofgren et al. |
| 6,092,149 A | 7/2000 | Hicken et al. |
| 6,092,150 A | 7/2000 | Sokolov et al. |
| 6,094,707 A | 7/2000 | Sokolov et al. |
| 6,105,104 A | 8/2000 | Guttmann et al. |
| 6,111,717 A | 8/2000 | Cloke et al. |
| 6,145,052 A | 11/2000 | Howe et al. |
| 6,175,893 B1 | 1/2001 | D'Souza et al. |
| 6,178,056 B1 | 1/2001 | Cloke et al. |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,359,433 B1 | 3/2002 | Gillis et al. |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,671,248 B2 | 12/2003 | Miyabata et al. |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,771,440 B2 | 8/2004 | Smith |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,822,985 B2 | 11/2004 | Tsunekane et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |

(56) References Cited

U.S. PATENT DOCUMENTS

| | | |
|---|---|---|
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,357 B2 | 11/2005 | Sakamoto et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,116,689 B2 | 10/2006 | Pitman |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,161,882 B2 | 1/2007 | Lehr et al. |
| 7,171,108 B1 | 1/2007 | Masters et al. |
| 7,171,110 B1 | 1/2007 | Wilshire |
| 7,177,253 B2 | 2/2007 | Ishibashi et al. |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,478,007 B2 | 1/2009 | Farrell et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,724,470 B2 | 5/2010 | Poon et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,876,655 B2 | 1/2011 | Sasaki |
| 7,898,756 B1 | 3/2011 | Wang |
| 7,898,759 B1 | 3/2011 | Matsumoto et al. |
| 7,898,762 B1 | 3/2011 | Guo et al. |
| 7,898,909 B2 | 3/2011 | Shimazawa et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |

(56) References Cited

U.S. PATENT DOCUMENTS

| | | |
|---|---|---|
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,243,388 B2 | 8/2012 | Shimazawa et al. |
| 8,271,692 B1 | 9/2012 | Dinh et al. |
| 8,279,550 B1 | 10/2012 | Hogg |
| 8,279,732 B2 | 10/2012 | Watanabe et al. |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,369,191 B2 | 2/2013 | Shimazawa |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,391,107 B2 | 3/2013 | Gage et al. |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 * | 12/2013 | Krichevsky ............ G11B 5/314 369/13.11 |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |

(56) References Cited

U.S. PATENT DOCUMENTS

| | | | |
|---|---|---|---|
| 8,780,470 B1 | 7/2014 | Wang et al. | |
| 8,782,334 B1 | 7/2014 | Boyle et al. | |
| 8,786,976 B1 | 7/2014 | Kang et al. | |
| 8,787,125 B1* | 7/2014 | Lee | G11B 5/6011 369/13.26 |
| 8,792,196 B1 | 7/2014 | Lee | |
| 8,792,200 B1 | 7/2014 | Tam et al. | |
| 8,797,667 B1 | 8/2014 | Barlow et al. | |
| 8,799,977 B1 | 8/2014 | Kapner, III et al. | |
| 8,817,413 B1 | 8/2014 | Knigge et al. | |
| 8,817,584 B1 | 8/2014 | Selvaraj | |
| 8,825,976 B1 | 9/2014 | Jones | |
| 8,825,977 B1 | 9/2014 | Syu et al. | |
| 2002/0136115 A1 | 9/2002 | Kadlec et al. | |
| 2004/0008594 A1* | 1/2004 | Tokita | G11B 7/1267 369/47.53 |
| 2004/0135595 A1 | 7/2004 | Chen et al. | |
| 2006/0233061 A1 | 10/2006 | Rausch et al. | |
| 2007/0014041 A1 | 1/2007 | Lille et al. | |
| 2007/0211594 A1* | 9/2007 | Tomishima | G11B 7/1267 369/53.26 |
| 2008/0101205 A1* | 5/2008 | Usui | G11B 7/1263 369/121 |
| 2008/0158730 A1 | 7/2008 | Furukawa et al. | |
| 2008/0298185 A1* | 12/2008 | Nakagawa | G11B 7/1263 369/47.5 |
| 2009/0113702 A1 | 5/2009 | Hogg | |
| 2009/0225464 A1 | 9/2009 | Juang et al. | |
| 2009/0296260 A1* | 12/2009 | Maeda | G11B 5/6064 360/75 |
| 2009/0303629 A1 | 12/2009 | Nakano et al. | |
| 2010/0278020 A1* | 11/2010 | Yang | G11B 7/0045 369/44.11 |
| 2010/0306551 A1 | 12/2010 | Meyer et al. | |
| 2011/0205861 A1 | 8/2011 | Erden et al. | |
| 2011/0226729 A1 | 9/2011 | Hogg | |
| 2012/0134246 A1 | 5/2012 | Shimazawa | |
| 2012/0159042 A1 | 6/2012 | Lott et al. | |
| 2012/0275050 A1 | 11/2012 | Wilson et al. | |
| 2012/0281963 A1 | 11/2012 | Krapf et al. | |
| 2012/0324980 A1 | 12/2012 | Nguyen et al. | |
| 2013/0007511 A1* | 1/2013 | Gaertner | G06F 11/1662 714/6.22 |
| 2013/0135975 A1 | 5/2013 | Gage et al. | |
| 2014/0119164 A1 | 5/2014 | Wilson et al. | |
| 2014/0201571 A1* | 7/2014 | Hosek | G06F 11/2257 714/26 |
| 2016/0372096 A1* | 12/2016 | Lyske | G10H 1/40 |

\* cited by examiner

DATA STORAGE DEVICE MODIFYING WRITE OPERATION WHEN A LASER MODE HOP IS DETECTED

BACKGROUND

Data storage devices such as disk drives may comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the actuator arm as it seeks from track to track.

Data is typically written to the disk by modulating a write current in an inductive coil to record magnetic transitions onto the disk surface in a process referred to as saturation recording. During readback, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface with a laser during write operations in order to decrease the coercivity of the magnetic medium, thereby enabling the magnetic field generated by the write coil to more readily magnetize the disk surface.

DETAILED DESCRIPTION

Figures 1A, 1B, 1C:
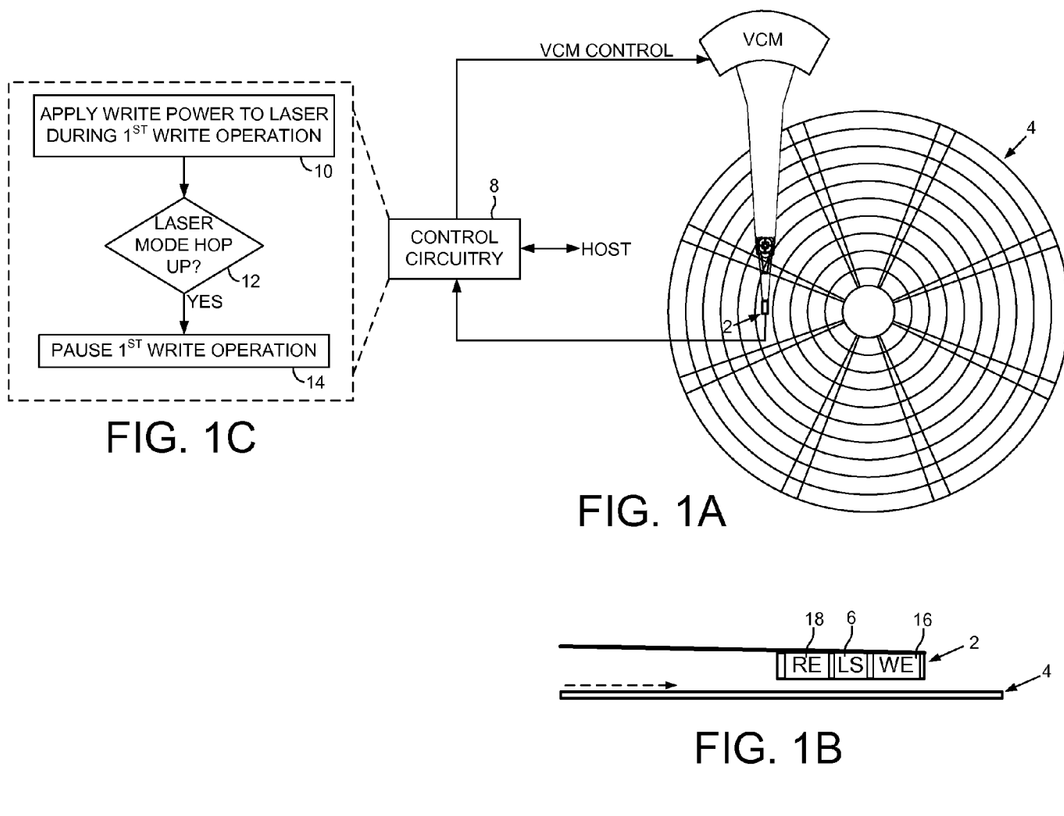
FIG. 1A shows a data storage device in the form of a disk drive comprising a head actuated over a disk surface according to an embodiment.
FIG. 1B shows a head according to an embodiment comprising a laser configured to heat the disk surface.
FIG. 1C is a flow diagram according to an embodiment wherein a write operation is paused when a transient increase in the output power of the laser is detected.

FIG. 1A shows a data storage device in the form of a disk drive according to an embodiment comprising a first head 2 actuated over a first disk surface 4, wherein the first head 2 (FIG. 1B) comprises a laser 6 configured to heat the first disk surface 4 while writing data to the first disk surface 4. The disk drive further comprises control circuitry 8 configured to execute the flow diagram of FIG. 1C, wherein a write power is applied to the laser when executing a first write operation (block 10). When a transient increase in an output power of the laser is detected during the first write operation (block 12), the first write operation is paused (block 14).

Any suitable head 2 may be employed, and in the embodiment of FIG. 1B, the head 2 comprises a suitable write element 16 (e.g., an inductive write coil) and a suitable read element 18 (e.g., a suitable magnetoresistive element). In addition, any suitable laser 6 may be employed, such as a suitable laser diode. In one embodiment, the write power applied to the laser 6 during write operations is calibrated in order to achieve an acceptable reliability of the recorded data. For example, a write power may be calibrated so as to provide a sufficient saturation of the media as well as a target magnetic write width (track width). Any suitable technique may be employed to calibrate the laser power, such as by writing a test pattern to the disk at different write powers and evaluating a quality metric of the resulting read signal when reading the test pattern.

In one embodiment, when the write power is applied to the laser 6 during a write operation, the laser 6 may exhibit a transient in output power (mode hop), for example, at a particular write power the laser may split into multiple frequencies, thereby reducing the intensity at the fundamental frequency used to heat the disk surface. If a mode hop down occurs during a write operation, the reliability of the recorded data may decrease since the media may be under saturated, and if a mode hop up occurs, the increased intensity of the laser beam may erase data in adjacent data tracks (intertrack interference). The propensity of the laser 6 to exhibit a mode hop during a write operation may depend on general degradation of the laser 6 over time, as well as environmental conditions such as temperature. For example, an increase in the temperature during normal operation of the disk drive may shift the laser 6 into an operating region where the calibrated write power results in a mode hop. Accordingly, in one embodiment the control circuitry 8 of FIG. 1A detects when a mode hop occurs during a write operation and takes suitable action, such as pausing a write operation when a mode hop up is detected, or triggering a write-verify when a mode hop down is detected (FIG. 2B). In addition, in one embodiment the control circuitry 8 may recalibrate the write power applied to the laser 6 when the mode hop persists.

Any suitable technique may be employed to detect when the laser 6 exhibits a mode hop during a write operation. In one embodiment illustrated in FIG. 2A, the head 2 may comprise a suitable photodiode 20 configured to detect the intensity of the laser beam emitted by the laser 6. In the example embodiment of FIG. 2B, the photodiode 20 may be biased with a voltage such that the current flowing through the photodiode 20 represents the output power of the laser 6, including the output power when a mode hop occurs. In one embodiment, the graph shown in FIG. 2B may shift left or right as the laser degrades over time, and/or as environmental conditions (e.g., ambient temperature) changes, and therefore the laser power where a mode hop occurs may shift such that it overlaps with the write power applied to the laser. In addition, the graph shown in FIG. 2B may shift during a write operation due to the continuous heating of the laser 6 and the resulting shift of the mode hop region may overlap with the write power applied to the laser.

Figure 3A:
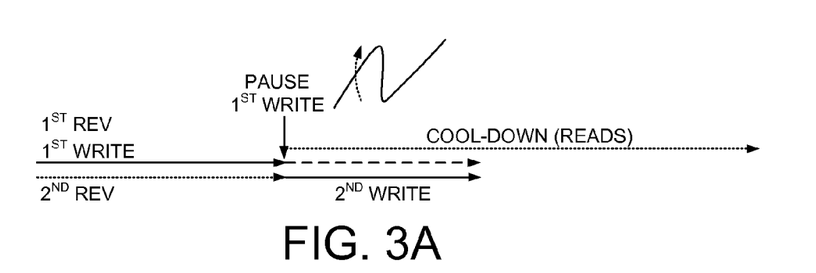
FIG. 3A shows an embodiment wherein when a transient increase in the output power of the laser is detected during a write operation, at least part of the write operation is retried during a second revolution of the disk surface after a cool-down interval.

FIG. 3A illustrates an embodiment wherein when a mode hop up is detected during a first write operation (during a first revolution of the disk), the first write operation is paused. The power applied to the laser is decreased for a cool-down interval, and after the cool-down interval, the write power is applied to the laser to execute a second write operation. In the example of FIG. 3A, the second write operation completes the first write operation during a second revolution of the disk. In this example, the cool-down interval may allow the laser 6 to cool sufficiently so that the remainder of the first write operation may be completed without the laser 6 exhibiting another mode hop. In another embodiment, a mode hop may be detected multiple times such that the first write operation may be executed in multiple segments over multiple revolutions of the disk until the last segment is successfully written before a mode hop occurs. In one embodiment, the control circuitry may execute at least one read operation during the cool-down interval as shown in FIG. 3A before completing the first write operation. For example, in one embodiment the second part of the first write operation may be processed together with other read operations as part of a rotation position optimization (RPO) algorithm that selects the next access command to execute in order to minimize a seek latency of the head and a rotational latency of the disk.

Figure 3B:
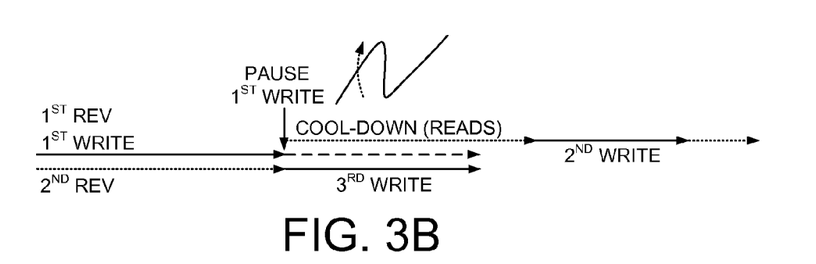
FIG. 3B shows an embodiment wherein at least one other write operation may be performed before retrying a paused write operation.

FIG. 3B illustrates an embodiment wherein after the cool-down interval the control circuitry may be configured to execute a second write operation that is separate from the first write operation. That is, the RPO algorithm may select a different write operation to execute before selecting the second part of the first write operation. In the example shown in FIG. 3B, the second write operation may be executed during the same revolution as the first part of the first write operation, but in other embodiments the second write operation may be executed during a different revolution of the disk depending on the sequence of access commands selected by the RPO algorithm.

Figure 4:
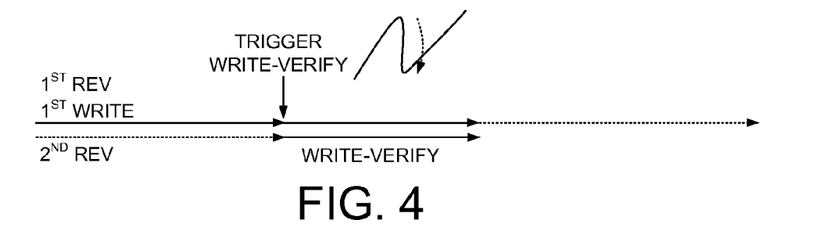
FIG. 4 shows an embodiment wherein when a transient decrease in the output power of the laser is detected during a write operation, a write-verify of the written data is triggered.

FIG. 4 shows an embodiment wherein when a transient decrease in the output power of the laser is detected during a first write operation, a write-verify is triggered. The write-verify is then executed during a second revolution of the disk by reading the written data to verify the recoverability. In this manner, when the recording quality decreases due to a transient decrease in the output power of the laser, the write operation continues but the recoverability of the written data is verified. In an embodiment described in greater detail below, when the write-verify fails, at least part of the first write operation is retried, and if the transient decrease in the output power of the laser persists, the write power for the laser is recalibrated.

Figure 5:
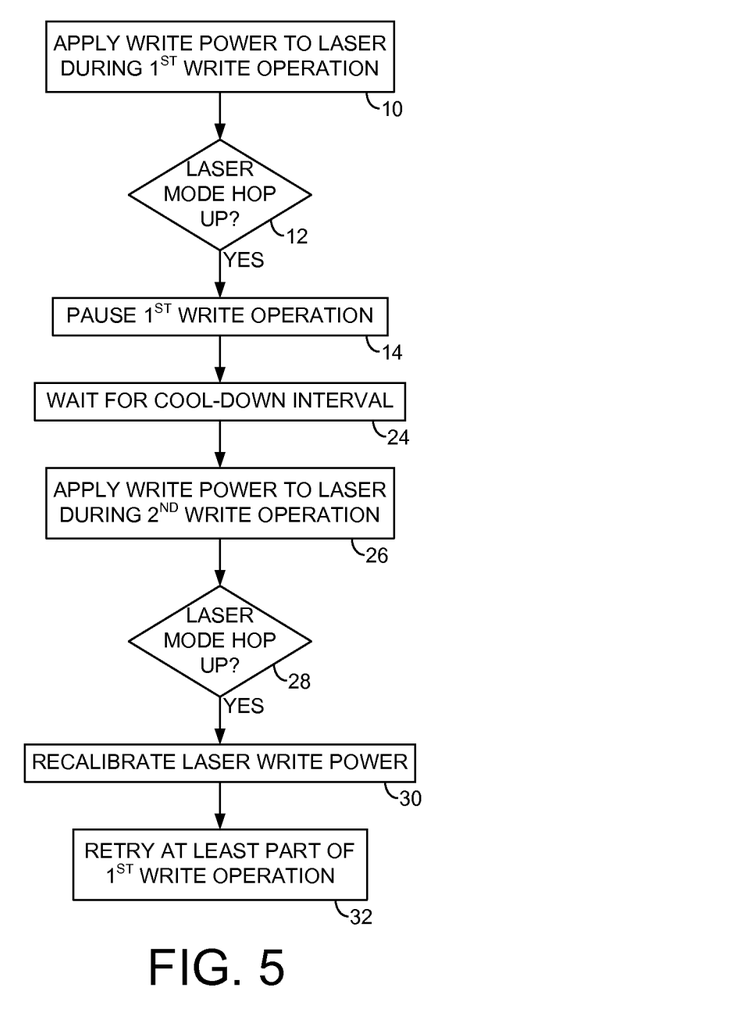
FIG. 5 is a flow diagram according to an embodiment wherein the write power of the laser is recalibrated when a transient increase in the laser output power is detected again during a second write operation.

FIG. 5 is a flow diagram according to an embodiment that expands on the flow diagram of FIG. 1C, wherein when a transient increase in the output power of the laser is detected (block 12) during a first write operation and the first write operation is paused (block 14), the control circuitry waits for a cool-down interval (block 24) and then executes a second write operation (block 26) which may be a different write operation or a continuation of the first write operation. If the transient increase in the output power of the laser is again detected during the second write operation (block 28), the write power for the laser is recalibrated (block 30). In one embodiment, the write power for the laser may be recalibrated so as to shift operation of the laser away from the mode hop region. For example, the write power may be decreased and a write-verify mode enabled to compensate for the decrease in recording quality. In another embodiment, the write power may be increased and the data of subsequent write operations written to an area of the disk surface having a lower track density (lower tracks per inch (TPI)) to compensate for the increase in the magnetic write width (track width). In another embodiment described below, the fly height of the head may be increased (by adjusting a fly height actuator (FHA) 22 of the head shown in FIG. 2A) so that the write power of the laser may be increased while maintaining the same magnetic write width. In one embodiment, recalibration of the laser write power may be delayed until a certain number transient increases in the output power has been detected, that is, when the mode hop persists due, for example, to a change in the ambient temperature of the disk drive.

In one embodiment, the control circuitry may recalibrate the laser write power such as described above when mode hop events are being detected and a change in an environmental condition has been detected (e.g., a change in ambient temperature) that is likely causing the mode hop events to occur. When the environmental condition reverts back to a normal level, the control circuitry may again recalibrate the laser write power to achieve better reliability and/or better performance by disabling the write-verify mode.

Figure 6A:
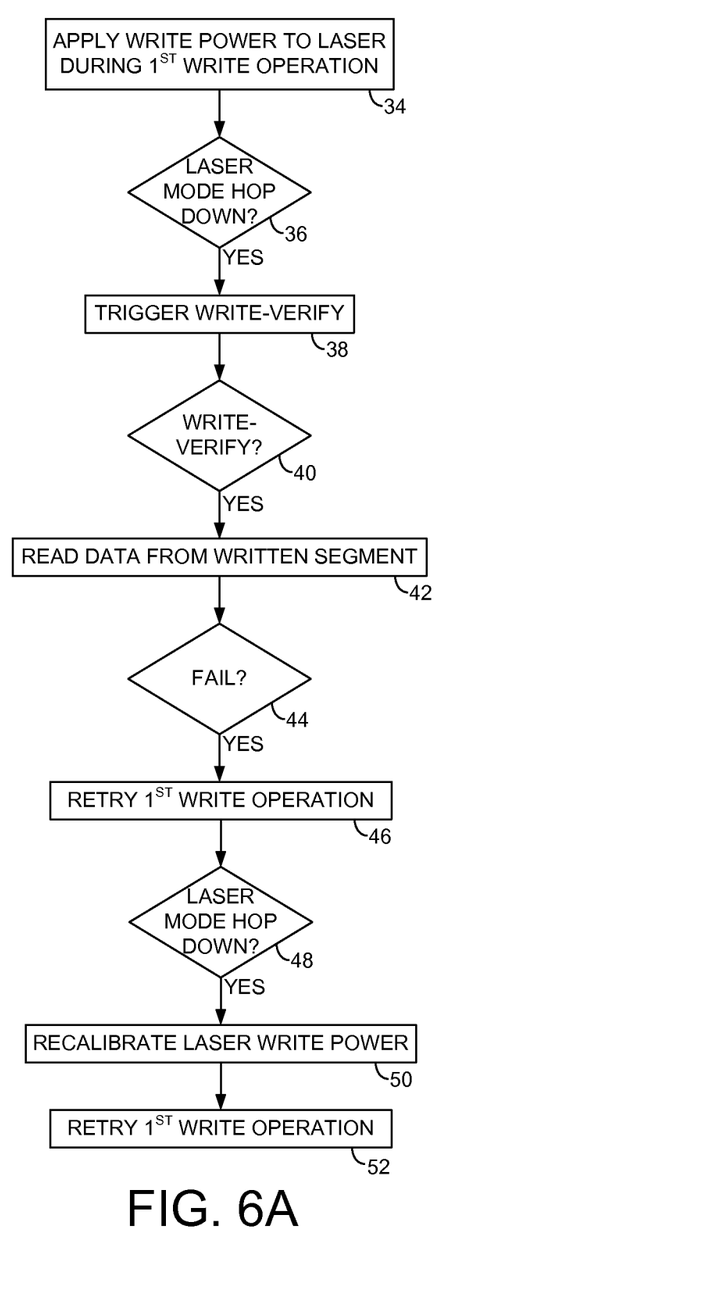
FIG. 6A is a flow diagram according to an embodiment wherein the write power of the laser is recalibrated when a transient decrease in the laser output power is detected during a retry of the write operation.
Figure 6B:
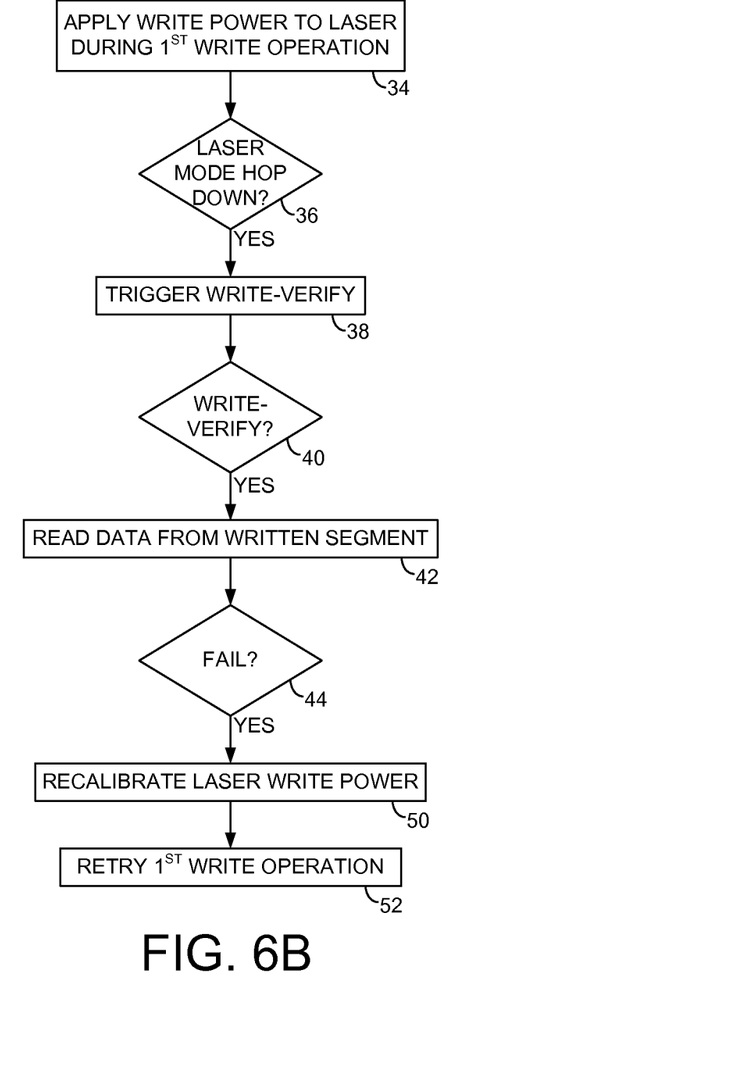
FIG. 6B is a flow diagram according to an embodiment wherein the write power of the laser is recalibrated when a write-verify of written data fails.

FIG. 6A is a flow diagram according to an embodiment wherein when a transient decrease (mode hop down) in the output power of the laser is detected (block 36) while executing a first write operation (block 34), a write-verify is triggered (block 38). When the write-verify is selected for execution (block 40), the data written during at least part of the first write operation is read from the disk surface to verify the recoverability (block 42). If the data is unrecoverable (block 44), then at least part of the first write operation is retried (block 46). When a mode hop down is again detected during the retry write operation (block 48), the laser write power is recalibrated (block 50) such as described above, and at least part of the first write operation is retried (block 52). FIG. 6B is a flow diagram illustrating an alternative embodiment wherein when the write-verify operation fails (block 44), the laser write power is recalibrated (block 50), and at least part of the first write operation is retried (block 52). Other embodiments may recalibrate the laser write power based on other criteria, such as after a predetermined number of mode hop down events are detected, or based on a degree to which a write-verify fails (e.g., a number of unrecoverable data sectors).

Figure 7A:
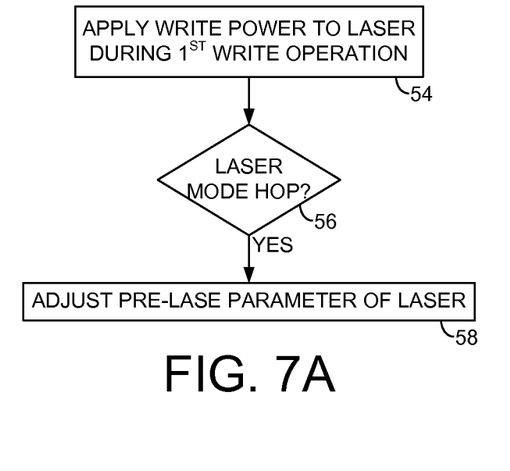
FIG. 7A is a flow diagram according to an embodiment wherein a pre-lase parameter is adjusted when a laser mode hop is detected during a write operation.
Figure 7B:
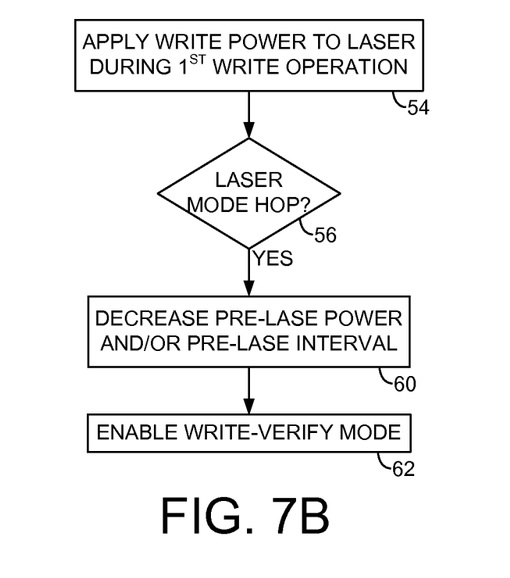
FIG. 7B is a flow diagram according to an embodiment wherein when a laser mode hop is detected during a write operation at least one of a pre-lase power and a pre-lase interval is adjusted and a write-verify mode is enabled.

FIG. 7A is a flow diagram according to an embodiment wherein when a mode hop event is detected (block 56) while executing a first write operation (block 54), a pre-lase parameter of the laser is adjusted (block 58). In this embodiment, a pre-lase power is applied to the laser for a pre-lase interval that precedes a write operation in order to "warm up" the laser prior to applying the write power to the laser, thereby improving the recording quality of the data at the beginning of the write operation. However, warming up the laser during a pre-lase interval may also result in a mode hop during the write operation due to the laser temperature exceeding a threshold. Accordingly in one embodiment when a mode hop event is detected (or a series of mode hop events are detected), a pre-lase parameter is adjusted, for example, to reduce the amount of heating during write operations. For example, in the flow diagram of FIG. 7B at least one of a pre-lase power applied to the laser and/or a pre-lase interval may be decreased (block 60) in order to decrease the overall heating of the laser during write operations. Also in the embodiment of FIG. 7B, after adjusting the pre-lase parameter(s), the control circuitry may enable a write-verify mode (block 62) to compensate for the lower write quality, particularly at the beginning of write operations. In one embodiment, the degree to which the pre-lase parameter(s) are adjusted may be proportional to a length of the ensuring write operation (e.g., the longer the write operation the lower the pre-lase power and/or the shorter the pre-lase interval).

Figure 2A:
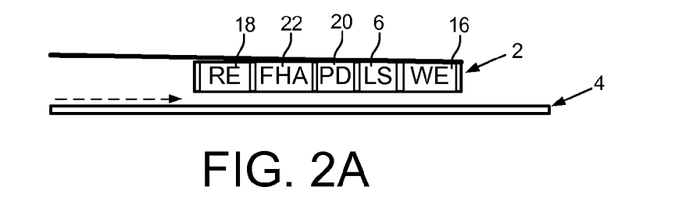
FIG. 2A shows a head according to an embodiment comprising a photodiode configured to measure the output power of the laser and a fly height actuator configured to control a fly height of the head.
Figure 2B:
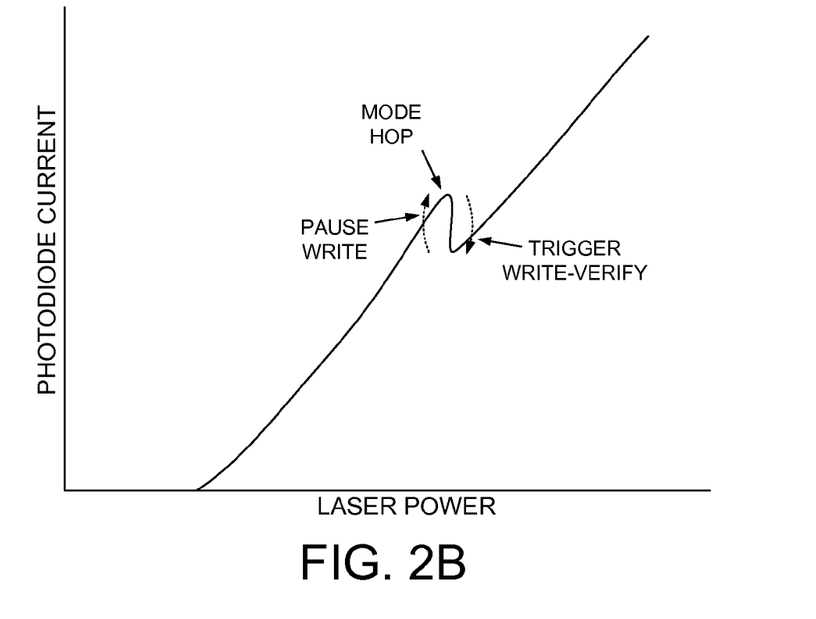
FIG. 2B illustrates a mode hop of the laser wherein the output power may exhibit a transient increase or decrease during a write operation according to an embodiment.
Figure 8:
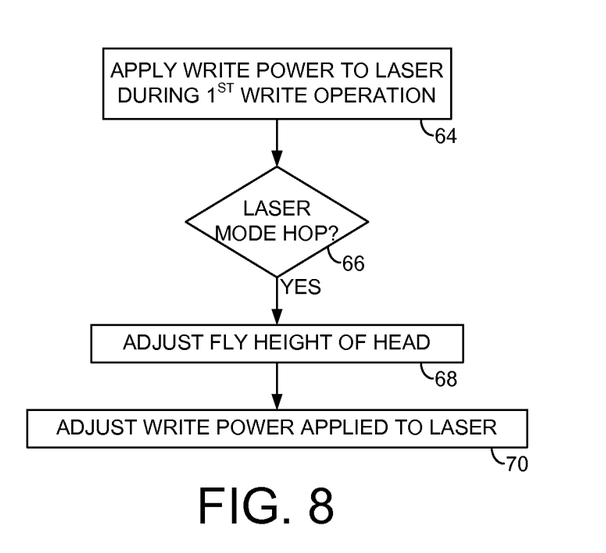
FIG. 8 is a flow diagram according to an embodiment wherein when a laser mode hop is detected during a write operation, the fly height of the head is decreased and the write power applied to the laser is increased.

FIG. 8 is a flow diagram according to an embodiment wherein when a mode hop event is detected (block 66) while executing a first write operation (block 64), a fly height of the head is adjusted (block 68) such as by decreasing a control signal applied to the FHA 22 of FIG. 2A in order to increase the fly height. A corresponding adjustment may then be made to the laser write power (e.g., by increasing the write power) during subsequent write operations (block 70). This embodiment may shift the laser into an operating region away from the mode hop region while maintaining a target magnetic write width (track width) and signal-to-noise ratio (SNR).

Figure 9:
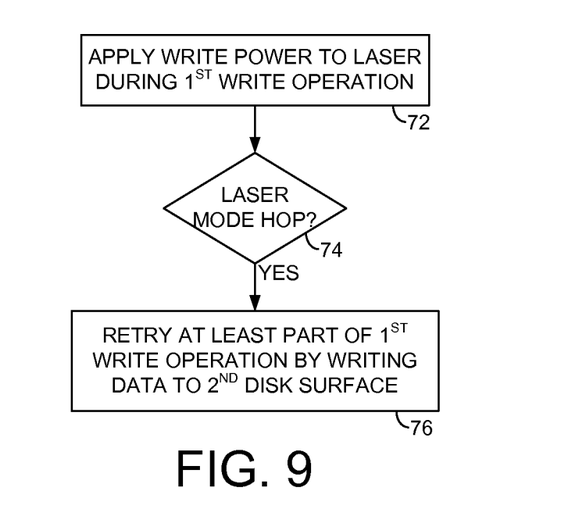
FIG. 9 is a flow diagram according to an embodiment wherein when a laser mode hop is detected during a write operation, at least part of the write operation is retried by writing data to a second disk surface.

FIG. 9 is a flow diagram according to an embodiment wherein when a mode hop event is detected (block 74) while executing a first write operation (block 72), at least part of the write operation is retried by writing data to a second disk surface (block 76). That is, in one embodiment the disk drive comprises a second head actuated over a second disk surface (not shown) that may be used to perform write operations when the first head is exhibiting mode hop events (e.g., due to an increase in the ambient temperature of the disk drive). In one embodiment, the second head may comprise a laser used to heat the second disk surface during write operations, wherein the laser of the second head may have different operating characteristics and therefore not exhibit mode hop events under the same operating conditions as the first head. In yet another embodiment, the second head and second disk surface may be of a non-HAMR type such that the second head does not require a laser and therefore the second head cannot suffer from mode hop events. In one embodiment, the control circuitry may monitor environmental conditions and/or perform test writes to the first disk surface during an idle mode in order to determine when it is safe to again write to the first disk surface.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:
1. A data storage device comprising:
a first disk surface;

a first head actuated over the first disk surface, wherein the first head comprises a laser configured to heat the first disk surface while writing data to the first disk surface; and control circuitry configured to:

apply a first write power to the laser and execute a first write operation;

detect a first transient increase in an output power of the laser during the first write operation; and pause the first write operation when the first transient increase in the output power of the laser is detected, wherein after pausing the first write operation the control circuitry is further configured to:

decrease power applied to the laser for a cool-down interval; and after the cool-down interval, apply the first write power to the laser and execute a second write operation after the cool-down interval.

2. The data storage device as recited in claim 1, wherein the first head further comprises a photodiode configured to detect the output power of the laser.

3. The data storage device as recited in claim 1, wherein the second write operation completes the first write operation.

4. The data storage device as recited in claim 1, wherein the control circuitry is further configured to execute at least one read operation during the cool-down interval.

5. The data storage device as recited in claim 1, wherein the control circuitry is further configured to:

detect a second transient increase in the output power of the laser during the second write operation; and recalibrate the write power of the laser when the second transient increase in the output power of the laser is detected.

6. The data storage device as recited in claim 1, wherein when the first transient increase in the output power of the laser is detected the control circuitry is further configured to adjust a pre-lase parameter of the laser, wherein the pre-lase parameter consists of at least one of:

a pre-lase power applied to the laser preceding a write operation to warm up the laser; and a pre-lase interval that the pre-lase power is applied to the laser preceding the write operation to warm up the laser.

7. The data storage device as recited in claim 6, wherein when the first transient increase in the output power of the laser is detected the control circuitry is further configured to enable a write-verify mode of the data storage device.

8. The data storage device as recited in claim 1, wherein when the first transient increase in the output power of the laser is detected the control circuitry is further configured to retry at least part of the first write operation by adjusting a fly height of the first head and adjusting the write power applied to the laser.

9. The data storage device as recited in claim 1, wherein:

the data storage device further comprises a second head actuated over a second disk surface; and when the first transient increase in the output power of the laser is detected the control circuitry is further configured to retry at least part of the first write operation by writing data to the second disk surface.

10. A method of operating a data storage device, the method comprising:

applying a first write power to a laser of a first head and executing a first write operation, wherein the laser is configured to heat a first disk surface while writing data to the first disk surface;

detecting a first transient increase in an output power of the laser during the first write operation; and pausing the first write operation when the first transient increase in the output power of the laser is detected, wherein after pausing the first write operation the method further comprises:

decreasing power applied to the laser for a cool-down interval; and after the cool-down interval, applying the first write power to the laser and executing a second write operation after the cool-down interval.

11. The method as recited in claim 10, wherein the first head further comprises a photodiode configured to detect the output power of the laser.

12. The method as recited in claim 10, wherein the second write operation completes the first write operation.

13. The method as recited in claim 10, further comprising executing at least one read operation during the cool-down interval.

14. The method as recited in claim 10, further comprising:

detecting a second transient increase in the output power of the laser during the second write operation; and recalibrating the write power of the laser when the second transient increase in the output power of the laser is detected.

15. The method as recited in claim 10, wherein when the first transient increase in the output power of the laser is detected the method further comprises adjusting a pre-lase parameter of the laser, wherein the pre-lase parameter consists of at least one of:

a pre-lase power applied to the laser preceding a write operation to warm up the laser; and a pre-lase interval that the pre-lase power is applied to the laser preceding the write operation to warm up the laser.

16. The method as recited in claim 15, wherein when the first transient increase in the output power of the laser is detected the method further comprises enabling a write-verify mode of the data storage device.

17. The method as recited in claim 10, wherein when the first transient increase in the output power of the laser is detected the method further comprising retrying at least part of the first write operation by adjusting a fly height of the first head and adjusting the write power applied to the laser.

18. The method as recited in claim 10, wherein when the first transient increase in the output power of the laser is detected the method further comprises retrying at least part of the first write operation by writing data to a second disk surface.

19. A data storage device comprising:

a first disk surface;

a first head actuated over the first disk surface, wherein the first head comprises a laser configured to heat the first disk surface while writing data to the first disk surface; and control circuitry configured to:

apply a write power to the laser and execute a first write operation;

detect a first transient increase in an output power of the laser during the first write operation; and when the first transient increase in the output power of the laser is detected, pause the first write operation and adjust a pre-lase parameter of the laser, wherein the pre-lase parameter consists of at least one of:
- a pre-lase power applied to the laser preceding a write operation to warm up the laser; and
- a pre-lase interval that the pre-lase power is applied to the laser preceding the write operation to warm up the laser.

20. A method of operating a data storage device, the method comprising:
applying a write power to a laser of a first head and executing a first write operation, wherein the laser is configured to heat a first disk surface while writing data to the first disk surface;
detecting a first transient increase in an output power of the laser during the first write operation; and
when the first transient increase in the output power of the laser is detected, pausing the first write operation and adjusting a pre-lase parameter of the laser, wherein the pre-lase parameter consists of at least one of:
- a pre-lase power applied to the laser preceding a write operation to warm up the laser; and
- a pre-lase interval that the pre-lase power is applied to the laser preceding the write operation to warm up the laser.

21. A data storage device comprising:
a first disk surface;
a first head actuated over the first disk surface, wherein the first head comprises a laser configured to heat the first disk surface while writing data to the first disk surface; and
control circuitry configured to:
apply a write power to the laser and execute a first write operation;
detect a first transient increase in an output power of the laser during the first write operation; and
when the first transient increase in the output power of the laser is detected, pause the first write operation and retry at least part of the first write operation by adjusting a fly height of the first head and adjusting the write power applied to the laser.

22. A method of operating a data storage device, the method comprising:
applying a write power to a laser of a first head and executing a first write operation, wherein the laser is configured to heat a first disk surface while writing data to the first disk surface;
detecting a first transient increase in an output power of the laser during the first write operation; and
when the first transient increase in the output power of the laser is detected, pausing the first write operation and retrying at least part of the first write operation by adjusting a fly height of the first head and adjusting the write power applied to the laser.

23. A data storage device comprising:
a first disk surface;
a first head actuated over the first disk surface, wherein the first head comprises a laser configured to heat the first disk surface while writing data to the first disk surface;
a second disk surface;
a second head actuated over the second disk surface; and
control circuitry configured to:
apply a write power to the laser and execute a first write operation;
detect a first transient increase in an output power of the laser during the first write operation; and
when the first transient increase in the output power of the laser is detected, pause the first write operation and retry at least part of the first write operation by writing data to the second disk surface.

24. A method of operating a data storage device, the method comprising:
applying a write power to a laser of a first head and executing a first write operation, wherein the laser is configured to heat a first disk surface while writing data to the first disk surface;
detecting a first transient increase in an output power of the laser during the first write operation; and
when the first transient increase in the output power of the laser is detected, pausing the first write operation and retrying at least part of the first write operation by writing data to a second disk surface.

\* \* \* \* \*